(12) United States Patent
Matsuno et al.

(10) Patent No.: US 10,490,808 B2
(45) Date of Patent: Nov. 26, 2019

(54) NON-AQUEOUS ELECTROLYTE SECONDARY BATTERY AND PRODUCTION METHOD THEREOF

(71) Applicant: KABUSHIKI KAISHA TOSHIBA, Minato-ku (JP)

(72) Inventors: Shinsuke Matsuno, Tokyo (JP); Hidesato Saruwatari, Saku (JP); Dai Yamamoto, Yokohama (JP); Asato Kondo, Yokohama (JP); Hiromichi Kuriyama, Toda (JP); Hideki Satake, Saku (JP); Takashi Kuboki, Tokyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/886,144

(22) Filed: Feb. 1, 2018

(65) Prior Publication Data

US 2018/0159119 A1 Jun. 7, 2018

Related U.S. Application Data

(60) Division of application No. 13/968,965, filed on Aug. 16, 2013, now Pat. No. 9,923,192, which is a (Continued)

(30) Foreign Application Priority Data

Feb. 18, 2011 (JP) .................................. 2011-033448
Aug. 26, 2011 (JP) .................................. 2011-185187

(51) Int. Cl.
*H01M 4/133* (2010.01)
*H01M 4/131* (2010.01)
(Continued)

(52) U.S. Cl.
CPC ........... *H01M 4/133* (2013.01); *H01M 4/131* (2013.01); *H01M 4/1391* (2013.01);
(Continued)

(58) Field of Classification Search
CPC .... H01M 4/131; H01M 4/1391; H01M 4/485; H01M 4/133; H01M 4/625;
(Continued)

(56) References Cited

U.S. PATENT DOCUMENTS

2001/0032386 A1 10/2001 Yamada et al.
2003/0008213 A1 1/2003 Cho
(Continued)

FOREIGN PATENT DOCUMENTS

CN 1585163 A 2/2005
CN 101436660 A 5/2009
(Continued)

OTHER PUBLICATIONS

International Search Report dated Apr. 24, 2012 in PCT/JP2012/053075 filed on Feb. 10, 2012.
(Continued)

*Primary Examiner* — Gary D Harris
(74) *Attorney, Agent, or Firm* — Oblon, McClelland, Maier & Neustadt, L.L.P.

(57) ABSTRACT

According to one embodiment, there is provided a non-aqueous electrolyte secondary battery including a positive electrode, a negative electrode including a negative electrode active material layer, and a non-aqueous electrolyte. The negative electrode active material layer contains carbon dioxide and releases the carbon dioxide in the range of 0.1 ml to 5 ml per 1 g when heated at 200° C. for 1 minute.

13 Claims, 2 Drawing Sheets

Related U.S. Application Data continuation of application No. PCT/JP2012/053075, filed on Feb. 10, 2012.

(51) Int. Cl.
  *H01M 4/1391* (2010.01)
  *H01M 4/485* (2010.01)
  *H01M 4/62* (2006.01)
  *H01M 10/052* (2010.01)
  *H01M 4/02* (2006.01)

(52) U.S. Cl.
  CPC .......... *H01M 4/485* (2013.01); *H01M 4/625* (2013.01); *H01M 10/052* (2013.01); *H01M 2004/021* (2013.01); *Y10T 29/49108* (2015.01)

(58) Field of Classification Search
  CPC .......... H01M 10/052; H01M 2004/021; Y10T 29/49108; Y02E 60/122; Y02P 70/54
  USPC .......................... 429/231.1, 231.8; 29/623.1
  See application file for complete search history.

(56) References Cited

U.S. PATENT DOCUMENTS

| | | | |
|---|---|---|---|
| 2005/0008938 A1 | 1/2005 | Cho | |
| 2005/0069484 A1 | 3/2005 | Manev et al. | |
| 2007/0204457 A1* | 9/2007 | Sato | H01M 4/13 29/623.1 |
| 2008/0118835 A1* | 5/2008 | Hur | H01M 4/131 429/219 |
| 2008/0241689 A1 | 10/2008 | Takami et al. | |
| 2008/0286643 A1 | 11/2008 | Iwasaki | |
| 2009/0119908 A1 | 5/2009 | Takeda et al. | |
| 2009/0202915 A1* | 8/2009 | Modeki | H01M 4/134 429/246 |
| 2009/0305131 A1 | 12/2009 | Kumar et al. | |
| 2012/0003541 A1 | 1/2012 | Song et al. | |
| 2012/0178570 A1 | 7/2012 | Gray, Jr. et al. | |
| 2012/0280172 A1 | 11/2012 | Takeda et al. | |

FOREIGN PATENT DOCUMENTS

| | | |
|---|---|---|
| JP | 1-307169 | 12/1989 |
| JP | 11-135121 | 5/1999 |
| JP | 11-339856 | 12/1999 |
| JP | 2000-58130 A | 2/2000 |
| JP | 2000-67925 A | 3/2000 |
| JP | 2000-90974 A | 3/2000 |
| JP | 2001-185140 | 7/2001 |
| JP | 2001-210372 A | 8/2001 |
| JP | 2002-216843 | 8/2002 |
| JP | 2002-216851 A | 8/2002 |
| JP | 2002-280077 A | 9/2002 |
| JP | 2002-352861 A | 12/2002 |
| JP | 2003-308880 A | 10/2003 |
| JP | 2004-95463 A | 3/2004 |
| JP | 2004-355977 A | 12/2004 |
| JP | 2005-26145 A | 1/2005 |
| JP | 2005-56609 A | 3/2005 |
| JP | 2005-108682 A | 4/2005 |
| JP | 2005-276782 A | 10/2005 |
| JP | 2005-327521 A | 11/2005 |
| JP | 2005-327592 A | 11/2005 |
| JP | 2007-227310 | 9/2007 |
| JP | 2008-166068 A | 7/2008 |
| JP | 2008-243612 A | 10/2008 |
| JP | 2010-238387 | 10/2010 |
| JP | 2011-51891 A | 3/2011 |
| JP | 2011-108407 | 6/2011 |
| JP | 2011-113735 | 6/2011 |
| JP | 2012-174416 A | 9/2012 |

OTHER PUBLICATIONS

Extended Search Report dated Jul. 16, 2014 in European Patent Application No. 12747366.8.
Tetsuya Osaka, et al., "Surface Characterization of Electrodeposited Lithium Anode with Enhanced Cycleability Obtained by $CO_2$ Addition", Journal of Electrochemical Society, XP055125622, May 5, 1997, pp. 1709-1713.
Office Action dated Jul. 1, 2015 in Chinese Patent Application No. 201280003688.8 (with English translation).
Japanese Office Action dated Apr. 1, 2014, in Japan Patent Application No. 2011-033448 (with English translation).
Extended Search Report dated Jul. 14, 2004 in European Patent Application No. 12746743.9.
Office Action dated Mar. 17, 2015 in Japanese Patent Application No. 2011-185187 (with English language translation).
Combined Chinese Office Action and Search Report dated Nov. 4, 2014 in Patent Application No. 201280003650.0 (with English Translation).
Combined Chinese Office Action and Search Report dated Nov. 15, 2014 in Patent Application No. 201280003688.8.0 (with English Translation).
Office Action in U.S. Appl. No. 14/753,836, dated Apr. 14, 2016.
M. Snyder, et al., "An Infrared Study of the Surface Chemistry of Lithium Titanate Spinel ($Li_4Ti_5O_{12}$)", Applied surface Science 253, 2007, pp. 9336-9341.

\* cited by examiner

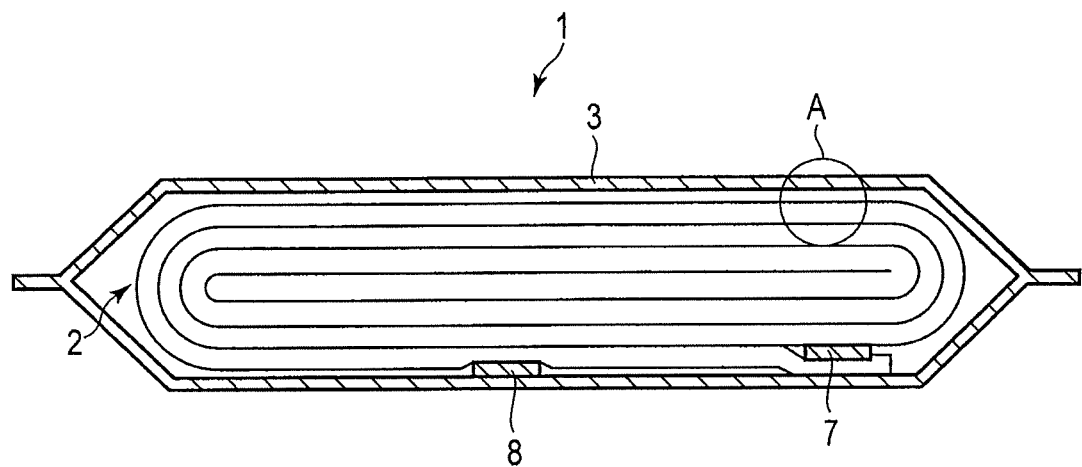
F I G. 1
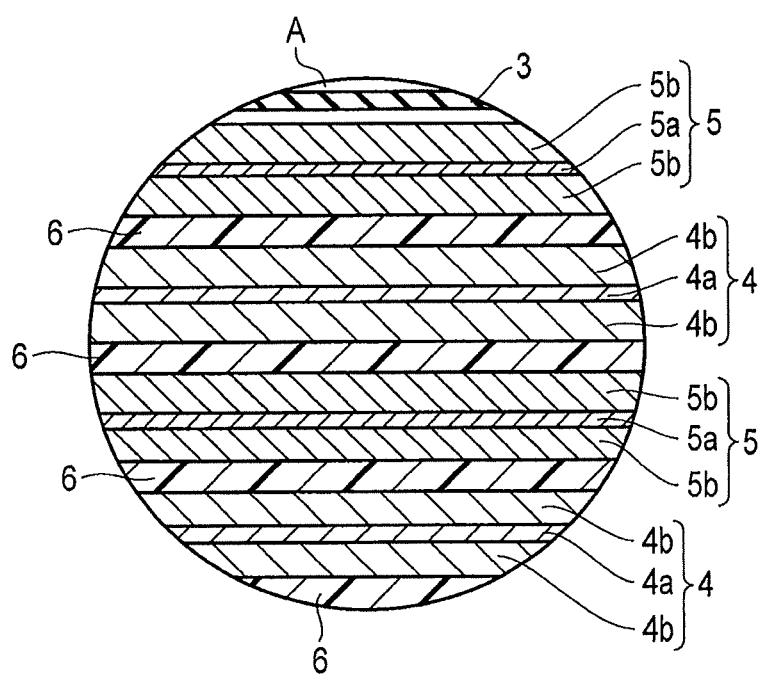
F I G. 2

NON-AQUEOUS ELECTROLYTE SECONDARY BATTERY AND PRODUCTION METHOD THEREOF

CROSS REFERENCE TO RELATED APPLICATIONS

This application is a Division of U.S. application Ser. No. 13/968,965, filed Aug. 16, 2013, now allowed; which is a Continuation Application of PCT Application No. PCT/JP2012/053075, filed Feb. 10, 2012 and based upon and claiming the benefit of priority from Japanese Patent Applications No. 2011-033448, filed Feb. 18, 2011; and No. 2011-185187, filed Aug. 26, 2011, the entire contents of all of which are incorporated herein by reference.

FIELD

Embodiments described herein relate generally to a non-aqueous electrolyte secondary battery and production method thereof.

BACKGROUND

It is known that an SEI (Solid Electrolyte Interface) film (hereinafter referred to as a film) is formed on the surface of a negative electrode active material included in a non-aqueous electrolyte secondary battery. This film is formed mainly due to the reductive decomposition of an electrolyte on a negative electrode at the time of an initial charge and discharge. Once the film is formed, the reaction between the electrolyte and the negative electrode can be suppressed. However, such a film is hardly formed in a non-aqueous electrolyte secondary battery using lithium titanate as a negative electrode active material. This is because a lithium ion absorption/release potential in the negative electrode including a lithium titanate is higher than the negative electrode used in the conventional batteries. When the film formation is insufficient, the reaction between the electrolyte and the negative electrode is not suppressed. In particular, when the battery is stored in a state close to a full charge at a high temperature, the decomposition reaction of the electrolyte is increased. Thus, there is a problem that gas generation due to the decomposition of the electrolyte is increased, resulting in the expansion of the battery. There is also a problem that the capacity retention ratio is decreased due to the rise of the internal resistance.

CITATION LIST

Patent Literature

Patent literature 1: Jpn. Pat. Appin. KOKAI Publication No. 2002-216843
Patent literature 2: Jpn. Pat. Appin. KOKAI Publication No. 11-339856

BRIEF DESCRIPTION OF THE DRAWINGS

FIG. 1 is a schematic cross-sectional view of a non-aqueous electrolyte secondary battery according to the embodiment;
FIG. 2 is an enlarged sectional view of section A shown in FIG. 1.

DETAILED DESCRIPTION

Figure 3:
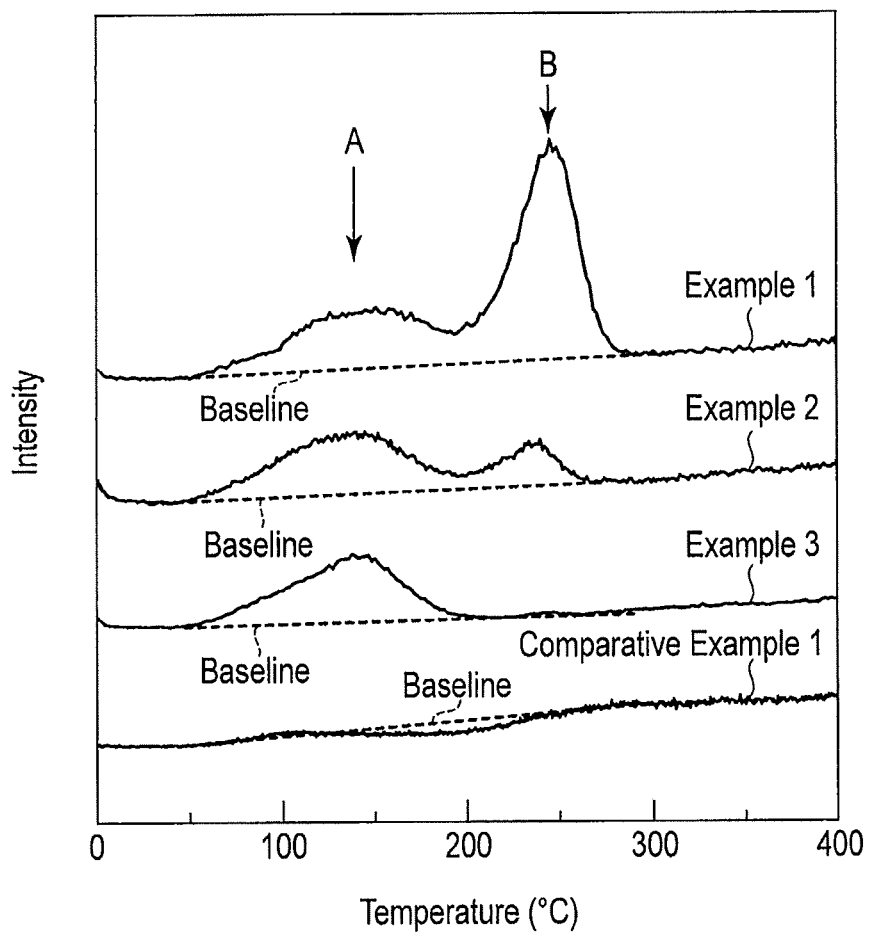
FIG. 3 is a measurement chart of the negative electrodes of Examples and Comparative Example by pyrolysis GC/MS.

In general, according to one embodiment, there is provided a non-aqueous electrolyte secondary battery which shows a suppression of expansion and deterioration of the capacity by suppressing the gas generation during storage.

In an aspect of the present invention, there is provided a non-aqueous electrolyte secondary battery including a positive electrode; a negative electrode including a negative electrode active material layer; and a non-aqueous electrolyte. The negative electrode active material layer contains carbon dioxide and releases the carbon dioxide in the range of 0.1 ml to 5 ml per 1 g when heated at 200° C. for 1 minute.

In another aspect, there is provided a method for producing a non-aqueous electrolyte secondary battery. The method comprises drying a powder of a negative electrode active material under heating, preparing a slurry containing the powder of the negative electrode active material after the heating, in an atmosphere of a dew point of −10° C. or less, and producing a negative electrode using the slurry, in an atmosphere of a dew point of −10° C. or less.

(First Embodiment)

FIG. 1 is a schematic cross-sectional view of a flat type non-aqueous electrolyte secondary battery. FIG. 2 is an enlarged sectional view of section A of FIG. 1. A battery 1 comprises a wound electrode group 2. The wound electrode group 2 is accommodated in a container 3. A non-aqueous electrolyte (not shown) is also filled in the container 3.

The wound electrode group 2 is a laminate wherein a separator 6 is interposed between a positive electrode 4 and a negative electrode 5. A flat type wound electrode group 2 is obtained by winding the laminate spirally and pressing it.

As shown in FIG. 1, in the vicinity of the outside peripheral end of the wound electrode group 2, a positive electrode terminal 7 is connected to the positive electrode 4, and a negative electrode terminal 8 is connected to the negative electrode 5. An exterior bag made of a laminated film is used for the container 3. The wound electrode group 2 and the non-aqueous electrolyte are sealed by heat-sealing an opening of the exterior bag 3, in the state where the positive electrode terminal 7 and the negative electrode terminal 8 are extended to outside through the opening. In addition, the container 3 is not limited to the exterior bag made of a laminated film, and, for example, it is also possible to use a metal can.

The positive electrode 4 comprises a positive electrode current collector 4a and a positive electrode active material layer 4b. The positive electrode active material layer 4b includes a positive electrode active material and optionally a conductive agent and a binder. The positive electrode active material layer 4b is formed on one or both surfaces of the positive electrode current collector 4a.

Examples of the positive electrode active material include lithium manganese composite oxide, lithium nickel composite oxide, and lithium-containing phosphate compound.

Examples of the lithium manganese composite oxide include a composite oxide such as $LiMn_2O_4$, and a hetero element-containing lithium manganese composite oxide such as $Li(Mn_xAl_y)_2O_4$ (wherein x+y=1) wherein a portion of Mn is substituted by a hetero element.

Examples of the lithium nickel composite oxide include an oxide such as $LiNiO_2$, and a hetero element-containing lithium nickel composite oxide such as $Li(Ni_xMn_yCo_z)O_2$ and $Li(Ni_xCo_yAl_z)O_2$ (wherein x+y+z=1) wherein a portion of Ni is substituted by a hetero element.

Examples of the lithium-containing phosphate compound include a phosphate such as $LiFePO_4$, and a hetero elementand lithium-containing phosphate such as $Li(Fe_xMn_y)PO_4$ (wherein x+y=1) wherein a portion of Fe of the $LiFePO_4$ is substituted by a hetero element.

Examples of the conductive agent include a carbonaceous material such as acetylene black, carbon black, and graphite.

Examples of the binder include polytetrafluoroethylene (PTFE), polyvinylidene fluoride (PVdF), fluorine-based rubber, ethylene-butadiene rubber (SBR), polypropylene (PP), polyethylene (PE), and carboxymethyl cellulose (CMC).

It is preferable to include the positive electrode active material, the conductive agent and the binder at a ratio of 80 to 95% by mass, 3 to 18% by mass, and 2 to 7% by mass, respectively, in the positive electrode active material layer 4b.

A metal foil is used as the positive electrode current collector 4a. As the metal, aluminum or an aluminum alloy containing one or more elements selected from the group consisting of Mg, Ti, Zn, Mn, Fe, Cu and Si is suitably used.

The negative electrode 5 comprises a negative electrode current collector 5a and a negative electrode active material layer 5b. The negative electrode active material layer 5b includes a negative electrode active material and optionally a conductive agent and a binder. The negative electrode active material layer 5b is formed on one or both surfaces of the negative electrode current collector 5a.

Examples of the negative electrode active material include lithium titanium composite oxide and titanium oxide. The lithium ion absorption potential of these oxides is preferably 0.4 V or more (versus $Li/Li^+$). Examples of the oxide having a lithium ion absorption potential of 0.4 V or more (versus $Li/Li^+$) include a lithium titanate having a spinel structure ($Li_{4+x}Ti_5O_{12}$) and a lithium titanate having a ramsdellite structure ($Li_{2+x}Ti_3O_7$). Here, x is in the range of 0 to 3 in all formulae. The titanium oxide (for example, $TiO_2$) absorbs the lithium by charge and discharge of the battery and is converted into lithium titanium oxide.

The negative electrode active material may contain any one of the above oxides, but may contain two or more oxides.

The average primary particle diameter of the negative electrode active material is preferably 5 μm or less. The negative electrode active material having an average primary particle diameter of 5 μm or less has a sufficient surface area. Thus, such a negative electrode active material has superior large current discharge characteristics.

The negative electrode active material has preferably a specific surface area of 1 to 10 $m^2/g$. The negative electrode active material having a specific surface area of 1 $m^2/g$ or more has a sufficient surface area. Thus, such a negative electrode active material has superior large current discharge characteristics. The negative electrode active material having a specific surface area of 10 $m^2/g$ or less has a low reactivity with the non-aqueous electrolyte. Accordingly, in such a negative electrode active material, decrease in charge and discharge efficiency as well as gas generation during storage can be suppressed.

Examples of the conductive agent include a carbonaceous material, such as acetylene black, carbon black, and graphite. It is preferable to use a carbonaceous material having a high absorption of alkali metal and a high conductivity.

Examples of the binder include polytetrafluoroethylene (PTFE), polyvinylidene fluoride (PVdF), fluorine-based rubber, styrene-butadiene rubber (SBR), polypropylene (PP), polyethylene (PE), and carboxymethyl cellulose (CMC).

It is preferable to include the negative electrode active material, the conductive agent and the binder at a ratio of 70 to 95% by mass, 0 to 25% by mass, and 2 to 10% by mass, respectively, in the negative electrode active layer 5b.

A metal foil is used as the negative electrode current collector 5a. As the metal, aluminum, an aluminum alloy containing one or more elements selected from the group consisting of Mg, Ti, Zn, Mn, Fe, Cu and Si, or copper is suitably used.

The non-aqueous electrolyte is prepared by dissolving an electrolyte in a non-aqueous solvent.

The known non-aqueous solvents used in lithium batteries can be used. The concentration of the electrolyte in the non-aqueous solvent is preferably 0.5 to 2 mol/L.

Examples of the non-aqueous solvent include a cyclic carbonate such as ethylene carbonate (EC) and propylene carbonate (PC), and a mixed solvent of a cyclic carbonate and a non-aqueous solvent having a lower viscosity than the cyclic carbonate (hereinafter referred to as "second solvent").

Examples of the second solvent include linear carbonate such as dimethyl carbonate, methyl ethyl carbonate or diethyl carbonate; γ-butyrolactone, acetonitrile, methyl propionate, ethyl propionate; cyclic ether such as tetrahydrofuran or 2-methyltetrahydrofuran; and linear ether such as dimethoxyethane or diethoxyethane.

Examples of the electrolyte include an alkali salt. Preferably, a lithium salt is used. Examples of the lithium salt include lithium hexafluorophosphate ($LiPF_6$), lithium tetrafluoroborate ($LiBF_4$), lithium hexafluoroarsenate ($LiAsF_6$), lithium perchlorate ($LiClO_4$), and lithium trifluoromethanesulfonate ($LiCF_3SO_3$). In particular, lithium hexafluorophosphate ($LiPF_6$) or lithium tetrafluoroborate ($LiBF_4$) is preferable.

The separator 6 prevents the positive electrode 4 and the negative electrode 5 from physical and electrical contact. The separator 6 is comprised of an insulating material, and has a shape enabling an electrolyte to permeate through it. The separator 6 may be formed from, for example, a non-woven fabric made of synthetic resin, a porous polyethylene film, a porous polypropylene film, or a cellulose-based separator.

The negative electrode active material layer 5b may contain carbon dioxide as an impurity. According to the present embodiment, the negative electrode active material layer contains carbon dioxide in an amount capable of releasing the carbon dioxide in the range of 0.1 ml to 5 ml per 1 g when heated at 200° C. for 1 minute. The reaction of the non-aqueous electrolyte with the negative electrode active material can be suppressed by allowing the negative electrode active material layer 5b to contain carbon dioxide in such an amount. As a result, the gas generation is suppressed. Because the amount of gas generated is reduced, expansion of the battery and deterioration of the battery capacity due to the rise in internal resistance can be suppressed.

The thickness of the film formed on the surface of the negative electrode using the lithium titanium composite oxide as the negative electrode material is 10 nm or less, or a film is often not formed. In such a battery, the non-aqueous electrolyte and the negative electrode are easy to react during storage at a high temperature. In particular, the reaction is increased at a temperature of 70° C. or more and a high state of charge (SOC: State of Charge), i.e., in a state close to full charge. Thus, a large amount of gas is generated, causing the expansion of the battery. In addition, the internal resistance is increased when gas is accumulated between the electrodes even in a very small amount, causing the deterioration of battery capacity.

However, according to the present embodiment, gas generation can be suppressed by containing carbon dioxide in an amount as described above in the negative electrode. This is because it is thought that carbon dioxide acts as a self-discharge accelerator in the non-aqueous electrolyte secondary battery.

Some of carbon dioxide contained in the negative electrode dissolves in a non-aqueous electrolyte by charge and discharge of the battery. The carbon dioxide contained in the non-aqueous electrolyte is reduced to carbon monoxide on the surface of the negative electrode. The carbon monoxide is oxidized to carbon dioxide on the surface of the positive electrode. In this way, it was found by the present inventors that carbon dioxide in the non-aqueous electrolyte can function as a shuttle compound that shuttles between the positive electrode and the negative electrode. Such oxidation-reduction reaction of carbon dioxide proceeds earlier than the reaction between the negative electrode and the non-aqueous electrolyte, or has a faster reaction rate. Therefore, the decomposition of the non-aqueous electrolyte is suppressed, resulting in the suppression of gas generation.

Since a self-discharge of carbon dioxide occurs by the oxidation-reduction reaction like this, a battery capacity after storage is decreased. However, the battery is not deteriorated because the oxidation-reduction reaction of carbon dioxide is reversible. Thus, by charging the battery again, it is possible to obtain a capacity that is not almost different from the capacity before storage. In addition, carbon dioxide also has an advantage that the concentration of the electrolyte is not decreased during storage of the battery because it hardly reacts with the electrolyte contained in the non-aqueous electrolyte.

It is possible to promote the self-discharge on the surface of the negative electrode as well as in the entire negative electrode active material layer by containing carbon dioxide in the negative electrode active material layer.

If the amount of carbon dioxide contained in the negative electrode active material layer is too much, carbon dioxide becomes a factor causing the generation of gas. On the other hand, if the amount of carbon dioxide is too small, carbon dioxide is insufficient to act as a self-discharge accelerator. Therefore, the decomposition of the non-aqueous electrolyte is not suppressed.

It is more preferable that the content of carbon dioxide in the negative electrode active material layer is such that carbon dioxide is released in an amount of 0.2 ml to 2 ml per 1 g when heated at 200° C. for 1 minute.

The amount of carbon dioxide contained in the active material layer can be measured by gas chromatography (GC). In the present embodiment, the amount of carbon dioxide generated when the active material layer is maintained at 200° C. for 1 minute is measured. When the heating temperature is too high, carbon dioxide derived from other ingredients is detected. For example, when heated at 500° C. or more, combustion of the binder occurs to generate carbon dioxide, or influence of the conductive agent such as carbon black occurs. Thus, the heating temperature in the GC measurement is preferably around 200° C.

The GC measurement can be carried out as follows. Using a spatula or the like, several mg of the negative electrode active material layer is scraped out from the negative electrode, and placed in a measurement container. This operation is carried out in a glove box under an inert gas atmosphere. As for such inert gas, an inert gas other than carbon dioxide, such as nitrogen and argon, is used. Then, the measurement container is introduced into a device while maintaining the inert gas atmosphere, and the amount of carbon dioxide generated when heating is carried out at 200° C. for 1 minute is measured. The humidity in the inert gas atmosphere is controlled so that a sample is prevented from adsorbing moisture, and, for example, the dew point is kept at −50° C. or less. In order to prevent carbon dioxide and moisture from being adsorbed onto the sample during collection and measurement, a prescribed atmosphere is to be maintained. It should be noted that the dew point refers to a temperature at which a partial water vapor pressure in the air equals a saturation pressure, and as used herein, the dew point is defined as a temperature at which a partial water vapor pressure in the air equals a saturation pressure when the temperature for both air and inert gas is lowered under a constant pressure.

The measurement of the negative electrode active material layer in the non-aqueous electrolyte secondary battery is performed as follows. At first a battery is disassembled in an inert gas atmosphere to take out an electrode. This negative electrode is washed with methyl ethyl carbonate (MEC) for 10 minutes. Then, the negative electrode is dried under a reduced pressure atmosphere of −80 kPa for 1 hour at room temperature without atmospheric exposure. Then, in the same manner as described above, the active material layer is collected and measured.

The above-mentioned GC measurement is carried out on a battery before the initial charge or an electrode. In addition, the active material layer is collected from a negative electrode that is in a state having a potential in the range of 2.5 V to 3.5 V relative to metallic lithium. When the electrode active material layer collected from a negative electrode having a potential outside the above range, such as a negative electrode in a state of charge, is measured, the resulting peaks will vary.

The existence form of carbon dioxide contained in the active material layer can be confirmed by the pyrolysis-gas chromatography/mass spectrometry (pyrolysis GC/MS). The pyrolysis GC/MS can be carried out by gas chromatography (GC) equipped with a pyrolyzer using a device directly connected to mass spectrometry (MS). The pyrolysis GC/MS measurement can be carried out in the same manner as described for the GC measurement.

In the case where carbon dioxide is contained in the active material layer or in the case where a substance that causes the generation of carbon dioxide is present, a peak appears in a peak chart obtained by the pyrolysis GC/MS measurement. It can be confirmed from this peak chart whether carbon dioxide is physically adsorbed or whether carbon dioxide exists as a compound such as lithium carbonate (for example, $Li_2CO_3$). It should be noted, in this case, that the lithium carbonate is intended to include lithium hydrogen carbonate (($LiH)_2CO_3$) wherein a portion of Li is substituted by H.

When the negative electrode active material layer is subjected to the pyrolysis GC/MS measurement, two peaks appear in the range of 120° C. to 350° C. These two peaks indicate that carbon dioxide exists in at least two different forms in the active material layer. Out of main peaks appearing at between 120° C. and 350° C., the peak at the low temperature side is referred to as peak A, and the peak at the high temperature side is referred to as peak B. Further, the pyrolysis GC/MS was measured under a temperature rising condition of 5° C./minute.

In the present embodiment, it is preferable that the ratio (a/b) of the peak intensity a of the low temperature side of the two peaks to the peak intensity b of the high temperature side is 1 or more.

The peak A of the low temperature side is derived from carbon dioxide that is loosely, physically-adsorbed onto the negative electrode. The peak B of the high temperature side is derived from carbon dioxide contained as a compound that is comprised of mainly lithium carbonate. Compounds such as lithium carbonate and the like will cause gas generation during storage of the battery at a high temperature and a high SOC.

If the peak intensity ratio (a/b) is equal to or greater than 1, carbon dioxide physically adsorbed on the negative electrode exists in a relatively larger amount than carbon dioxide existing as a compound such as lithium carbonate. In this case, it is possible to suppress more effectively the amount of gas generated when the battery is stored at a high temperature and a high SOC.

In order to reduce the amount of gas generated when the battery is stored at a high temperature and a high SOC, it is preferable that the amount of carbon dioxide existing as a compound such as lithium carbonate is small. However, the compound such as lithium carbonate may promote the production of a film on the surface of the negative electrode. The film suppresses the reaction between the non-aqueous electrolyte and the negative electrode. Thus, it is preferable for the negative electrode active material to contain a very small amount of carbon dioxide existing as a compound such as lithium carbonate. For example, the peak intensity ratio (a/b) is, but not limited to, preferably 1000 or less. The peak intensity ratio (a/b) is preferably 1 or more, more preferably in the range of 1.05 to 10000, and further preferably in the range of 1.4 to 1000.

The physically adsorbed carbon dioxide onto the negative electrode is released when the negative electrode active material layer is heated at about 200° C. On the other hand, carbon dioxide contained as a compound such as lithium carbonate is released when heated at a temperature higher than 200° C., for example, at 300° C. Thus, by heating the negative electrode active material layer at 200° C., it is possible to measure the amount of carbon dioxide that contributes to the promotion of self-discharge. In addition, as described above, the smaller is preferable as for the amount of carbon dioxide existing as a compound such as lithium carbonate. Therefore, the amount of carbon dioxide released when the negative electrode active material layer is heated at 300° C. for 1 minute is preferably in the range of 0.5 ml to 3 ml per 1 g of the negative electrode active material layer.

The peak intensities a and b can be obtained by drawing a baseline in a peak chart at between, for example, 50° C. and 300° C. and subtracting the baseline value from the intensity a of the peak A of the low temperature side and the intensity b of the peak B of the high temperature side.

(Second Embodiment)

Next, a method for producing a non-aqueous electrolyte secondary battery will be explained. The method comprises heating a powder of a negative electrode active material; preparing a slurry using the powder of the negative electrode active material after the heating, under an atmosphere of a dew point of −10° C. or less; and producing a negative electrode using the slurry, under the atmosphere described above. Here, the temperature of heating the powder of the negative electrode active material is preferably in the range of 250° C. to 650° C.

It has been confirmed by the present inventors that carbon dioxide adsorbed on the negative electrode reacts with moisture to easily produce lithium carbonate. In particular, at the negative electrode using a lithium titanium composite oxide as the negative electrode active material, moisture adsorbed on the surface of the active material easily reacts with lithium in the active material, resulting in easy production of lithium carbonate. Thus, the amount of moisture in the atmosphere is made to reduce during production of the battery.

The negative electrode active material produced by the conventional solid-phase method adsorbed a large amount of carbon dioxide and moisture. When a negative electrode active material containing a lot of carbon dioxide is used, lithium carbonate is easily produced in the production of the negative electrode, depending on the production environment. Therefore, at first, degassing and drying is performed by the heat treatment of the negative electrode active material. Thus, it is possible to remove the carbon dioxide and moisture from the negative electrode active material. The degassing and drying is preferably carried out under an inert gas atmosphere where the dew point is controlled, so that re-adsorption of carbon dioxide and moisture is suppressed. For example, such degassing and drying is preferably carried out under an inert gas atmosphere of a dew point of −10° C. or less. The heating temperature is preferably in the range of 250° C. to 650° C., and more preferably in the range of 150° C. to 600° C. The heating time is preferably in the range of 3 to 24 hours.

Then, in an atmosphere of a dew point of −10° C. or less, a slurry containing the powder of the negative electrode active material after the heating is prepared. More specifically, a negative electrode active material, a conductive agent, and a binder are suspended in a solvent. As the solvent, for example, N-methylethylpyrrolidone can be used. This slurry is applied to a negative electrode current collector, and then dried to form a negative electrode active material layer. Then, by pressing the negative electrode active material layer together with the negative electrode current collector, a negative electrode can be produced. Preparation of the slurry may be carried out under an atmosphere of air or inert gas. The prepared slurry and the produced negative electrode are preferably placed under an atmosphere of a dew point of −10° C. or less, in order to prevent adsorption of moisture.

A positive electrode can be produced as follows. First, a positive electrode active material, a conductive agent and a binder are suspended in a solvent to prepare a slurry. As the solvent, for example, N-methylethylpyrrolidone can be used. Next, the slurry is applied to a positive electrode current collector and dried to form an active material layer. Then, the positive electrode active material layer is pressed together with the positive electrode current collector to produce a positive electrode.

An electrode group is produced by using the produced negative electrode, positive electrode, and a separator. The positive electrode, a first separator, the negative electrode, and a second separator are laminated in this order to produce a laminate. This laminate is spirally wound so that the negative electrode is positioned on the outermost periphery. By pressing the wound laminate under heating, it is possible to produce a flat-shaped electrode group.

A battery can be produced by accommodating the produced electrode group in a container, injecting a non-aqueous electrolyte therein, and sealing the container.

Production of the electrode group and assembly of the battery can be carried out under an atmosphere of air or inert gas. The atmosphere is preferably at a dew point of −10° C. or less.

In any steps of the above processes, argon or nitrogen can be used as an inert gas.

By controlling the treatment conditions during the heat treatment of the powder of the negative electrode active material, the amount of moisture contained in the powder can be made smaller than the amount of carbon dioxide present in the powder. Thus, it is possible to adjust the peak intensity ratio (a/b) of the negative electrode active material layer measured by the pyrolysis GC/MS to 1 or more. For example, the peak intensity ratio (a/b) can be increased by raising the heating temperature or lengthening the heating time. The contents of moisture and carbon dioxide in the above powder refer to moisture and carbon dioxide generated when the powder is heated at 600° C. for 1 minute in the GC measurement.

The peak intensity ratio (a/b) can be also increased by performing the processes from preparation of the slurry through assembly of the battery in an atmosphere of a low dew point.

In addition, adsorption of carbon dioxide on the negative electrode active material will vary depending on the type, surface area, and composition of compounds used as a negative electrode active material. Therefore, even by using a combination of different compounds as the negative electrode active material, it is possible to control the amount of carbon dioxide contained in the negative electrode active material layer.

According to the above embodiments, there can be provided a non-aqueous electrolyte secondary battery showing a suppression of gas generation during its storage as well as showing a suppression of both expansion and capacity deterioration. For example, even when a battery using lithium titanium composite oxide as the negative electrode active material is stored at a high temperature and a high SOC, the expansion and capacity deterioration can be suppressed.

EXAMPLES

Example 1

<Production of Negative Electrode>

A powder of lithium titanium oxide ($Li_4Ti_5O_{12}$) having a spinel structure was prepared as a negative electrode active material. The $Li_4Ti_5O_{12}$ has a lithium absorption potential of 1.55 V (versus $Li/Li^+$). The $Li_4Ti_5O_{12}$ powder was heated at 250° C. for 6 hours under an argon gas atmosphere.

The $Li_4Ti_5O_{12}$ powder after the heat treatment, graphite, and PVdF were added to NMP at a ratio of 90% by mass, 5% by mass, and 5% by mass, respectively, and mixed using glass beads for 30 minutes to prepare a slurry for negative electrode.

The slurry for negative electrode was applied to both surfaces of a current collector made from aluminum foil having a thickness of 15 μm, and dried to form a negative electrode active material layer. The negative electrode active material layer was pressed together with the current collector to produce a negative electrode. The density of the negative electrode active material layer was 2.0 g/cm³.

The preparation of the slurry, application, drying and pressing were carried out under an atmospheric environment of a dew point of −10° C.

<Production of Positive Electrode>

A lithium-nickel-manganese-cobalt composite oxide ($LiNi_{0.33}Mn_{0.33}Co_{0.33}O_2$) powder, acetylene black, graphite, and polyvinylidene fluoride (PVdF) were added to and mixed in NMP at a ratio of 91% by mass, 2.5% by mass, 3% by mass, and 3.5% by mass, respectively, thereby to prepare a slurry for positive electrode.

The slurry for positive electrode was applied to both surfaces of an aluminum foil (a current collector) having a thickness of 15 μm, and dried to form a positive electrode active material layer. The positive electrode active material layer was pressed together with the current collector to produce a positive electrode. The density of the positive electrode active material layer was 3.3 g/cm³.

<Production of Electrode Group>

An electrode group was produced using the positive electrode and the negative electrode produced above and a porous polyethylene film having a thickness of 20 μm as a separator. A laminate was produced by laminating the positive electrode, a first separator, the negative electrode, and a second separator in this order. This laminate was spirally wound so that the negative electrode was positioned on the outermost periphery. The wound laminate was pressed while heating at 90° C. to produce a flat electrode group. The dimensions of the electrode group were 58 mm in width, 95 mm in height, and 3.0 mm in thickness.

The obtained electrode group was accommodated in a bag-shaped container, and dried under vacuum at 80° C. for 24 hours. The container was made of a laminate film having a thickness of 0.1 mm that was comprised of an aluminum foil having a thickness of 40 μm and a polypropylene layer formed on both surfaces of the aluminum foil.

The production of the electrode group was carried out under the same atmosphere as in the preparation of the slurry for negative electrode.

<Preparation of Non-aqueous Electrolyte>

Ethylene carbonate (EC) and methyl ethyl carbonate (MEC) were mixed in a volume ratio of 1:2 to prepare a mixed solvent. Lithium hexafluorophosphate ($LiPF_6$) was dissolved in the mixed solvent at a concentration of 1.0 mol/L to prepare a non-aqueous electrolyte.

<Production of Battery>

The non-aqueous electrolyte was injected into a container in which an electrode group had been accommodated, and then sealed to produce a non-aqueous electrolyte secondary battery as shown in FIG. 1. This battery had a capacity of 3 Ah.

The production of the electrode was carried out under the same atmosphere as that for the preparation of the slurry for negative electrode.

Examples 2 to 7

A battery was produced in the same manner as in Example 1, except that the heating conditions of the powder of the negative electrode active material and the dew point during the production process were changed as shown in Table 1.

Comparative Example 1

A battery was produced in the same manner as in Example 1, except that the heating conditions of the powder of the negative electrode active material and the dew point during the production process were changed as shown in Table 1.

Comparative Example 2

A battery was produced in the same manner as in Example 1, except that the powder of the negative electrode active material was not subjected to the heat treatment and the production process was carried out in an argon gas atmosphere where the dew point was not controlled. The humidity of the atmosphere in the production process was 53%.

<Measurement of the Amount of Released Carbon Dioxide and Pyrolysis GC/MS Measurement>

The amount of carbon dioxide contained in the negative electrodes produced in Examples 1 to 7 and Comparative Examples 1 and 2 was measured. First, the negative electrode active material layer and the aluminum foil were separated under an inert gas atmosphere of −70° C., and a portion of the negative electrode active material layer (containing the conductive agent and the binder) was collected and subjected to GC measurement. The measurement was performed under the conditions of heating at 200° C. for 1 minute to measure the amount of generated carbon dioxide. The released amount of carbon dioxide per unit mass of the negative electrode active material layer was calculated from the obtained values. The results were shown in Table 1.

In addition, a portion of the negative electrode active material layer collected in the same manner as described above was subjected to the pyrolysis GC/MS measurement. The peak charts of Examples 1 to 3 and Comparative Example 1 were shown in FIG. 3. As shown in FIG. 3, a baseline was set in the range of 50° C. of the low temperature side to 300° C. of the high temperature side. The baseline value was subtracted from the intensity a of the low temperature side peak A and from the intensity b of the high temperature side peak B. Then, the peak intensity ratio (a/b) was calculated using the obtained values. The results were shown in Table 1.

In addition, in Comparative Example 1, the peak was lower than the baseline. In such a case, because the peak intensity could not be detected, the peak intensity ratio was determined to be unmeasurable.

TABLE 1

| | Heating treatment conditions of powder | Dew point | Amount of released carbon dioxide (ml/g negative electrode active material layer) | Peak intensity ratio a/b |
|---|---|---|---|---|
| Example 1 | 250° C. 6 hours | −10° C. | 1.6 | 0.27 |
| Example 2 | 450° C. 6 hours | −25° C. | 2.2 | 1.41 |
| Example 3 | 500° C. 6 hours | −20° C. | 3.8 | 13.8 |
| Example 4 | 250° C. 6 hours | −15° C. | 5.0 | 2.62 |
| Example 5 | 450° C. 6 hours | −50° C. | 0.1 | 1.80 |
| Example 6 | 250° C. 3 hours | −20° C. | 2.4 | 1.00 |
| Example 7 | 650° C. 6 hours | −25° C. | 1.8 | 1000 |
| Comparative Example 1 | 800° C. 6 hours | −70° C. | 0.08 | Unmeasurable |
| Comparative Example 2 | — | — | 6.5 | 0.18 |

In all of Examples 1 to 7, the amount of carbon dioxide contained in the negative electrode was in the range of 0.1 to 5 ml per 1 g of the negative electrode active material layer. The peak intensity ratio (a/b) was 1 or more in the measurement chart of the pyrolysis GC/MS of Examples 2 to 7. In Example 7, the peak intensity ratio (a/b) was significantly high. It is thought that this is because the heating temperature of the negative electrode active material powder was high, so that only a little amount of lithium carbonate was produced.

Comparative Example 1 was obtained by heating the powder of the negative electrode active material under severe conditions. The amount of carbon dioxide contained in the negative electrode of Comparative Example 1 was significantly low. In the measurement chart of the pyrolysis GC/MS, the two peaks were very low and vague, and thus the intensity (b) of the peak B could not be confirmed.

Comparative Example 2 relates to a battery that was produced in an atmosphere that was not controlled, without the heat treatment of the powder of the negative electrode active material. The amount of carbon dioxide contained in the negative electrode of Comparative Example 2 was significantly high. Also, in the measurement chart of the pyrolysis GC/MS, the two peaks were very high, and the intensity (b) of the peak B was greater than the intensity (a) of the peak A.

<Storage Test>

Two batteries according to Examples 1 to 7 and two batteries according to Comparative Examples 1 to 2 were prepared. The thickness of each battery was measured at SOC 50%. Then, the battery of each of the Examples and Comparative Examples was adjusted to SOC 30% or SOC 100% at 1 C rate. Each battery was stored under an environment of 70° C. for 1 week.

The battery after storage was discharged at 1 C rate under the environment of 25° C. without charging, and the capacity of the battery was measured. The capacity at this time is referred to as a remaining capacity. From the capacity before storage (theoretical capacity) and the remaining capacity, a decreasing ratio of the capacity after storage was calculated and this calculated value was defined as a self-discharge ratio (%). For example, if a battery having a capacity of 3 Ah is adjusted to SOC 30%, a theoretical capacity is 0.9 Ah. If the remaining capacity after storage is 0.72 Ah, the decreasing ratio of the capacity (i.e., self-discharge rate) is 20%.

After measurement of the remaining capacity, a charge and discharge test at 1 C rate was conducted once and then the capacity was measured. A capacity retention ratio relative to the capacity before storage (theoretical capacity) was calculated using the measured capacity. For example, if a battery has a capacity of 3 Ah before storage and 2.7 Ah after storage, the capacity retention ratio is 90%.

In addition, each battery was charged at 1 C rate to adjust it to SOC 50%, and its thickness was measured. The ratio of the thickness after storage relative to the thickness before storage was calculated as an expansion ratio (times).

These results are shown in Table 2 below.

TABLE 2

| | Storage at SOC 30% | | | Storage at SOC 100% | | |
|---|---|---|---|---|---|---|
| | Expansion ratio (times) | Self-discharge ratio (%) | Capacity retention ratio (%) | Expansion ratio (times) | Self-discharge ratio (%) | Capacity retention ratio (%) |
| Example 1 | 1.09 | 18 | 91 | 1.23 | 19 | 90 |
| Example 2 | 1.15 | 22 | 95 | 1.06 | 21 | 95 |
| Example 3 | 1.18 | 25 | 96 | 1.08 | 27 | 94 |
| Example 4 | 1.21 | 30 | 98 | 1.16 | 33 | 96 |
| Example 5 | 1.06 | 6 | 82 | 1.04 | 4 | 83 |
| Example 6 | 1.18 | 21 | 93 | 1.10 | 23 | 91 |
| Example 7 | 1.10 | 20 | 93 | 1.02 | 17 | 92 |
| Comparative Example 1 | 1.04 | 3 | 73 | 1.03 | 2 | 78 |
| Comparative Example 2 | 1.32 | 45 | 71 | 2.23 | 38 | 68 |

The expansion ratio was significantly large in Comparative Example 2 in which the amount of carbon dioxide released from the negative electrode was greater than 5 ml. When a battery like this is used as a battery that constitutes a battery module, there is a risk of damaging a bus bar that connects the batteries each other. Further, the capacity retention ratio of Comparative Example 2 was significantly low. It is thought that this is because the expansion ratio was too high, so that gas was accumulated in between the electrodes and thus, the internal resistance increased significantly, causing the deterioration of the capacity.

The expansion ratio and self-discharge ratio of the battery of Comparative Example 1 were small, but the capacity retention ratio was low. It is thought that this is because the amount of carbon dioxide contained in the negative electrode was too little, so that the self-discharge was not promoted.

All of the batteries according to Examples 1 to 7 showed a lower expansion ratio than the battery according to Comparative Example 2, and even when the batteries were stored at SOC 100%, the expansion ratio was less than 1.3 times. A battery showing an expansion ratio of less than 1.3 times after storage can be used as a battery that constitutes a module comprising a plurality of batteries. In addition, all the batteries according to Examples 1 to 7 showed a higher self-discharge ratio and a higher capacity retention ratio than the battery according to Comparative Example 1. Thus, it was shown that by containing carbon dioxide equal to or more than 0.1 ml in the negative electrode, the self-discharge was promoted, and by promoting the self-discharge, the deterioration of the capacity was suppressed.

Further, when the amount of carbon dioxide was in the range of 5 ml or less, the larger the amount of carbon dioxide was, the greater the self-discharge ratio was.

It can be seen from the results when stored at SOC 100% that each battery according to Examples 2 to 7 having a peak intensity ratio a/b equal to or greater than 1 showed particularly a low expansion ratio and generally a high capacity retention rate. In addition, the capacity retention ratio of the battery according to Example 5 was lower than that of the battery according to Example 1. It is thought this is because that the amount of carbon dioxide was low and then, the self-discharge ratio was low.

It was shown from the above results that when the negative electrode contains carbon dioxide in the amount as defined in the embodiment, the expansion can be suppressed and the capacity deterioration can also be suppressed even when stored at a high temperature and at a high SOC state.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST

1 . . . Non-aqueous electrolyte secondary battery; 2 . . . Wound electrode group; 3 . . . Container; 4 . . . Positive electrode; 4a . . . Positive electrode current collector; 4b . . . Positive electrode active material layer; 5 . . . Negative electrode; 5a . . . Negative electrode current collector; 5b . . . Negative electrode active material layer; 6 . . . Separator; 7 . . . Positive electrode terminal; 8 . . . Negative electrode terminal.

What is claimed is:

1. A method for producing a non-aqueous electrolyte secondary battery, comprising:
drying a powder of a negative electrode active material by heating;
preparing a slurry containing the powder of the negative electrode active material after the heating, under an atmosphere of a dew point of −10° C. or less; and
producing a negative electrode by using the slurry, under an atmosphere of a dew point of −10° C. or less.

2. The method according to claim 1,
wherein the temperature for heating the powder of the negative electrode active material is in the range of 250° C. to 650° C.

3. The method according to claim 1, wherein the temperature for heating the powder of the negative electrode active material is in the range of 150° C. to 600° C.

4. The method according to claim 1, wherein a time for heating the powder of the negative electrode active material is in the range of 3 to 24 hours.

5. The method according to claim 1, wherein production of the negative electrode comprises:
applying the slurry to a negative electrode current collector;
drying the slurry to form a negative electrode active material layer; and
pressing the negative electrode active material layer together with the negative electrode current collector.

6. The method according to claim 1, wherein preparation of the slurry comprises suspending the negative electrode active material, a conductive agent, and a binder in a solvent.

7. The method according to claim 1, wherein the negative electrode active material comprises at least one oxide selected from the group consisting of a lithium titanium composite oxide and a titanium oxide.

8. The method according to claim 7, wherein the oxide has a lithium ion absorption potential of 0.4 V or more (versus $Li/Li^+$).

9. A method for producing a non-aqueous electrolyte secondary battery, comprising:
drying a powder of a negative electrode active material by heating;
preparing a slurry containing the powder of the negative electrode active material after the heating, under an atmosphere of a dew point of −10° C. or less; and
producing a negative electrode by using the slurry, under an atmosphere of a dew point of −10° C. or less,
wherein the non-aqueous electrolyte battery comprises:
a positive electrode;
a negative electrode comprising a negative electrode active material layer; and
a non-aqueous electrolyte;
wherein the negative electrode active material layer contains carbon dioxide and releases the carbon dioxide in the range of 0.1 ml to 5 ml per 1 g when heated at 200° C. for 1 minute.

10. The method according to claim 6, wherein production of the negative electrode comprises:
applying the slurry to a negative electrode current collector;
drying the slurry to form a negative electrode active material layer; and
pressing the negative electrode active material layer together with the negative electrode current collector.

11. The method according to claim 7, wherein production of the negative electrode comprises:
- applying the slurry to a negative electrode current collector;
- drying the slurry to form a negative electrode active material layer; and
- pressing the negative electrode active material layer together with the negative electrode current collector.

12. The method according to claim 8, wherein production of the negative electrode comprises:
- applying the slurry to a negative electrode current collector;
- drying the slurry to form a negative electrode active material layer; and
- pressing the negative electrode active material layer together with the negative electrode current collector.

13. The method according to claim 9, wherein production of the negative electrode comprises:
- applying the slurry to a negative electrode current collector;
- drying the slurry to form a negative electrode active material layer; and
- pressing the negative electrode active material layer together with the negative electrode current collector.

* * * * *